(12) United States Patent  
Wamorkar et al.

(10) Patent No.: US 9,363,478 B2
(45) Date of Patent: *Jun. 7, 2016

(54) ARCHITECTURE FOR HIGH AVAILABILITY CONFERENCING

(71) Applicant: LIFESIZE, INC., Austin, TX (US)

(72) Inventors: Vivek Wamorkar, Bangalore (IN); Boby Skaria Pullamkottu, Bangalore (IN); Ramesh Krishnamani Venkatasubramanian, Bangalore (IN)

(73) Assignee: LIFESIZE, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,115

(22) Filed: Feb. 12, 2015

(65) Prior Publication Data

US 2015/0156457 A1 Jun. 4, 2015

Related U.S. Application Data

(63) Continuation of application No. 13/517,760, filed on Jun. 14, 2012, now Pat. No. 9,021,301.

(51) Int. Cl.
| | |
|---|---|
| *H04N 7/15* | (2006.01) |
| *G06F 11/20* | (2006.01) |
| *H04L 12/18* | (2006.01) |
| *H04M 3/56* | (2006.01) |
| *H04L 29/14* | (2006.01) |
| *H04L 29/06* | (2006.01) |
| *G06F 11/07* | (2006.01) |

(52) U.S. Cl.
CPC ............. *H04N 7/15* (2013.01); *G06F 11/0757* (2013.01); *G06F 11/20* (2013.01); *G06F 11/2023* (2013.01); *G06F 11/2028* (2013.01); *G06F 11/2038* (2013.01); *G06F 11/2048* (2013.01); *H04L 12/1818* (2013.01); *H04L 12/1827* (2013.01); *H04L 65/4038* (2013.01); *H04L 69/40* (2013.01); *H04M 3/56* (2013.01)

(58) Field of Classification Search
None
See application file for complete search history.

(56) References Cited

U.S. PATENT DOCUMENTS

| | | | |
|---|---|---|---|
| 6,976,055 | B1 | 12/2005 | Shaffer |
| 7,035,252 | B2 | 4/2006 | Cave |
| 7,318,107 | B1 | 1/2008 | Menon |
| 7,340,523 | B2 | 3/2008 | Van Dyke |
| 7,404,001 | B2 | 7/2008 | Campbell |
| 7,460,508 | B2 | 12/2008 | Dssouli |
| 7,590,692 | B2 | 9/2009 | Van Dyke |
| 7,769,021 | B1 | 8/2010 | Chen |
| 7,974,621 | B2 | 7/2011 | Zhou |
| 7,987,266 | B2 * | 7/2011 | Joshi et al. ............ 709/225 |
| 8,150,917 | B2 | 4/2012 | Sekaran |
| 8,225,137 | B2 | 7/2012 | White |
| 8,489,386 | B2 | 7/2013 | Gisby |

(Continued)

*Primary Examiner* — Yolanda L Wilson
(74) *Attorney, Agent, or Firm* — Meyertons Hood Kivlin Kowert & Goetzel, P.C.; Jeffrey C. Hood; Mark S. Williams

(57) ABSTRACT

Providing high availability multi-way conferencing. Separate signaling and media components may be provided within an MCU or among a cluster of MCUs. A signaling server may control signaling aspects of a conference while a media server may provide media support for the conference. In the event of media server failure, the signaling server may assign a new media server to provide media support for the conference. A backup signaling server may also monitor the signaling server and may provide signaling support for the conference in the event of signaling server failure.

12 Claims, 9 Drawing Sheets

(56) References Cited

U.S. PATENT DOCUMENTS

| | | |
|---|---|---|
| 8,593,939 B2 | 11/2013 | Croak |
| 8,631,134 B2 | 1/2014 | Ceragioli |
| 8,699,700 B2 | 4/2014 | Williams |
| 2007/0263824 A1 | 11/2007 | Bangalore |
| 2007/0285501 A1 | 12/2007 | Yim |
| 2008/0069089 A1 | 3/2008 | Raisch |
| 2008/0077665 A1* | 3/2008 | Sekaran et al. ............... 709/204 |
| 2009/0110169 A1 | 4/2009 | Whitsell |
| 2010/0085959 A1 | 4/2010 | Vohra |
| 2011/0292163 A1 | 12/2011 | Haltom |

* cited by examiner

ARCHITECTURE FOR HIGH AVAILABILITY CONFERENCING

CONTINUATION AND PRIORITY DATA

This application is a Continuation of U.S. application Ser. No. 13/517,760, filed Jun. 14, 2012, whose inventors were Vivek Wamorkar, Boby Skaria Pullamkottu, and Ramesh Krishnamani Venkatasubramanian, and which is hereby incorporated by reference in its entirety as though fully and completely set forth herein.

FIELD OF THE INVENTION

The present invention relates generally to conferencing and, more specifically, to a method for providing high availability conferences, very large conferences, and optimized use of bandwidth and hardware resources.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to one or more other (remote) participants. Each videoconferencing system may also include a display and speaker to reproduce video and audio received from remote participant(s).

Multipoint Control Units (MCUs) are used in some conferencing systems. An MCU may be capable of hosting multiple audio-video conferences that allow multiple participants to join in.

Some conferencing systems seek to provide a high availability conferencing infrastructure, such that conferences which are disconnected (e.g., due to MCU failure or for other reasons) remain available for reconnection. In most cases the mechanisms for such systems relate to ways for either users to re-dial into the system or the system to re-dial the users. These mechanisms are unable to avoid a potentially irritating interruption to the users. In addition, these mechanisms typically require user intervention, which may be an additional annoyance. These problems may further result in a loss of productivity due directly to time lost from the interruption and reconnection process, and indirectly due to distractions caused by the interruption and reconnection process. Accordingly, improvements in high-availability conferencing would be desirable.

SUMMARY OF THE INVENTION

Various embodiments are presented of a system and method for providing high availability in conferencing (e.g., videoconferencing) systems. Various advantages may accrue from separating signaling from media functions in multipoint control units (MCUs) and/or in clusters of MCUs in the various embodiments.

In particular, separating signaling from media functions may enable the signaling component to move media streams of endpoints from one media engine/server to another without disconnecting the conferences in which the endpoints are participating, and without substantial interruption to the conferences in which the endpoints are participating. This call movement capability may be leveraged for a variety of benefits, including seamless fail-over between media engines/servers, a simplified contact system utilizing a single contact address for an entire cluster, improved media resource and bandwidth utilization, a novel way of providing a large scale conference, and other benefits according to various embodiments.

In addition, according to some embodiments, a backup signaling engine/server may be utilized to provide an additional layer of fail-over protection, in order to provide seamless fail-over between signaling engines/servers, e.g., in addition to the fail-over provided between media engines/servers. Such a combination of fail-over mechanisms may provide excellent fail-over experience, such that end-users may not be required to intervene as a result of failure of a signaling server or as a result of failure of a media server, and in many cases the fail-over process may be nearly or entirely unnoticeable by the end-users.

One set of embodiments relate to a method for providing high availability conferencing by an MCU. The MCU may include a signaling engine (which may be a signaling server) and multiple media engines (which may be media servers). The signaling server may be configured to receive and dial calls with endpoints, to handle protocol negotiations with endpoints, to host a scheduler (e.g., to execute a scheduler program and/or store scheduling data relating to scheduled conferences). The signaling server may also select and assign media servers to provide media support for conferences. The media servers may provide media support for conferences (e.g., for endpoints participating in conferences), which may include any or all of receiving, decoding, mixing, compositing, encoding, and transmitting media streams to and from endpoints participating in the conferences, among other possible functions. The media servers may each have a certain number of ports, which may correspond to the number of media streams for which they are able (e.g., based on hardware capability) to provide media support.

Aspects of the method may be implemented by the signaling server and/or the media servers, in some embodiments. More particularly, in some embodiments, the signaling server may include a computer accessible memory medium, on which program instructions executable by the signaling server (e.g., by a processor in the signaling server) to implement aspects of the method may be stored. The signaling server may further be configured to perform network communication; for example, the signaling server may include a network communication module (e.g., a network interface card) for communicating over a network (e.g., a LAN, WAN, or any type of network). In some embodiments, the signaling server may be configured to communicate with the media servers internally to the MCU, e.g., using bus communications (e.g., via a system and/or expansion bus), or via TCP and/or network connections.

Similarly, each media server may include a computer accessible memory medium, on which program instructions executable by the respective media server (e.g., by a processor in the respective media server) to implement aspects of the method may be stored. The media servers may also be configured to perform network communication; for example, the media servers may also a network communication module for communicating over a network (e.g., a LAN, WAN, or any type of network). In some embodiments, the media servers may be configured to communicate with the signaling server (and/or other media servers) internally to the MCU, e.g., using bus communications (e.g., via a system and/or expansion bus). Note that in some embodiments, some elements of the MCU may be shared by one or more media servers and/or the signaling server; for example, according to one set of embodiments, the MCU may include one network communication module which may be shared by all internal engines of the MCU. Other configurations are also possible.

Each media server may register with the signaling server. As part of registering, a media server may provide information indicating the media support capability and/or other capabilities of the media server. For example, the media servers may indicate for how many streams it can provide decoding, mixing, compositing, encoding, etc. This information may be implied, in some embodiments, by indicating how many ports the media server has.

The signaling server may store/maintain such information. In addition, the signaling server may maintain information indicating the current utilization of ports for each media server registered with the signaling server. In some embodiments, the signaling serve may use such information, and potentially other information, in selecting a media server to provide media support for a given conference. For example, in one set of embodiments, the signaling server may determine the locations of endpoints participating in conferences, and may base selection of media servers to provide support for conferences at least in part on such location information. According to one embodiment, the signaling server may select a media server to provide media support for a conference based on locations of the endpoints in order to minimize WAN usage (e.g., to optimize bandwidth utilization).

The signaling server may be configured to establish a first call with a first endpoint. Establishing the first call may include dialing or receiving the first call, and handling initial protocol negotiations, e.g., to initiate a session (e.g., an SIP, RTP, H.323, or other type of session). The signaling server may also establish a first media stream between the first endpoint and a first media server. The first endpoint may participate in a first conference; the first media server may provide media support for the first conference. In some embodiments, the first media server may be selected to provide media support for the first conference based on locations of the first endpoint and one or more other endpoints participating in the first conference.

The signaling server may be configured to establish the first media stream as a peer-to-peer media stream between the first endpoint and the first media server; alternatively, the signaling server may route the first media stream (e.g., packets of the first media stream) to the first media server (e.g., the signaling server may include a media router).

At some point, the first media server may fail. The signaling server may determine that the first media server has failed. In response to determining that first media server has failed, the signaling server may be configured to re-route the first media stream between the first endpoint and a second media server. The first endpoint may remain connected to the first conference after the first media server has failed, e.g., during the transition to the second media server. The second media server may provide media support for the first conference after the first media server has failed. The participant(s) at the first endpoint may not be required to intervene and may experience minimal or no interruption in their live conference experience as a result of the failure of the first media server and the movement of their call to the second media server.

If the first media stream flows through the signaling server (e.g., if the signaling server includes a media router), re-routing the first media stream may include transmitting the first media stream to the second media server instead of the first media server. If the first media stream was established as a peer-to-peer media stream between the first endpoint and the first media server, the signaling server may provide an indication to the first endpoint to re-route the first media stream to the second media server. For example, the signaling server may instruct the first endpoint to update its media attributes to reflect that the second media server is providing media support for the first conference.

Any other endpoints participating in the first conference may also have their media streams re-routed to the second media server in a similar manner upon failure of the first media server. Similarly, any endpoints participating on other conferences supported by the first media server at the time of its failure may have their calls moved to the second media server or another media server of the MCU.

Another set of embodiments relate to a method for providing large scale videoconferencing by an MCU, such as an MCU according to any of the above-described embodiments for providing high-availability conferencing. In particular, according to some embodiments, the MCU may similarly include separate signaling and media servers, and may leverage the capability for call movement without disconnection gained thereby to provide a large scale conference in which multiple media servers are utilized to provide media support for the conference. Aspects of the method for providing large scale conferencing may be combined with aspects of the method for providing high availability conferencing as desired, according to some embodiments.

The signaling server may register a plurality of media servers, which may include storing capability information for the media servers. Media streams may be established between each of a first group of endpoints and a first media server. The first media server may generate an audiovisual output based on media streams received from the first group of endpoints. The first group of endpoints may be "active" endpoints, e.g., may include the most active or most recently active speakers in the conference. The first media server may thus be considered to provide an "active" conference.

Media streams may also be established between each of a second group of endpoints and a second media server. The second media server may forward the audiovisual output provided by the first media server to the second group of endpoints. The second group of endpoints may be "passive" endpoints, e.g., may include endpoints which are less active speakers or less recently active speakers than those endpoints in the first group of endpoints. The second media server may thus be considered to provide a "passive" conference. The second media server may monitor the media streams received from the second group of endpoints for speaker activity. In some embodiments, this may include receiving and/or monitoring only audio portions of media streams provided by the second group of endpoints, e.g., to detect whether any participants at endpoints in the second group of endpoints have begun speaking.

The second media server may detect (e.g., based on the above-described monitoring) that a first endpoint, which may be in the second group of endpoints, has speaker activity. For example, the second media server may detect voice activity from a first media stream corresponding to the first endpoint. The second media server may generate an active speaker indication corresponding to the first endpoint based on detecting the speaker activity. The active speaker indication may be provided to the first media server and/or the signaling server.

The signaling server may receive the active speaker indication corresponding to the first endpoint. In response, the signaling server may re-route the first media stream of the first endpoint to the first media server. The first endpoint may remain connected to the videoconference during re-routing of the first media stream. After re-routing, the first endpoint may be in the first group of endpoints, and the first media stream may be included in the audiovisual output generated by the first media server and provided to the first and second groups of endpoints. In other words, because the first endpoint became an active speaker, the signaling server moved the first endpoint from the passive conference to the active conference, so that all other endpoints in the conference may be provided with audiovisual content generated by the first endpoint.

In some embodiments, an endpoint may need to be moved away from the first media server in order to move the first endpoint to the first media server. For example, if the first media server is at its capacity for providing media support (e.g., all of its ports are occupied), some capacity may need to be freed up in order to move the first endpoint to the first media server. Accordingly, in some embodiments, a second media stream of a second endpoint may be re-routed from the first media server to the second media server based on the active speaker indication and/or based on re-routing the first media stream of the first endpoint to the first media server. The second media stream may be selected for re-routing based on determining that the second endpoint is a least active endpoint in the first group of endpoints, in some embodiments. Other reasons for selecting the second media stream/ the second endpoint are also possible. The second endpoint may remain connected to the videoconference during re-routing of the second media stream. After re-routing, the second endpoint may be in the second group of endpoints, and the second media stream may no longer be included in the audiovisual output generated by the first media server and provided to the first and second groups of endpoints. In other words, because the second endpoint became (relatively) inactive, the signaling server moved the second endpoint from the active conference to the passive conference, so that the first endpoint, which had become active, could be moved to the active conference.

Of course, at a later time, the second endpoint (or any other endpoint in the second group of endpoints) may become an active speaker again and may be moved back to the active conference. In this way, participants in the conference may be seamlessly moved between active and passive conferences such that a unified view of the conference is presented to all participants, in which the most active speakers are always displayed and/or heard.

A further set of embodiments relate to a method for providing high availability conferencing by a cluster of MCUs. The cluster may include multiple signaling servers (also referred to as scale servers) and multiple MCUs. Aspects of the method may be implemented by one or more of signaling servers, and/or by one or more of the MCUs, according to various embodiments. Each signaling server and/or MCU may include at least a computer accessible memory medium and a processor, the memory medium storing program instructions executable by the processor to implement aspects of the method appropriate to the type of device (e.g., MCU or signaling server). According to some embodiments, each signaling server and MCU may also include one or more a network communication modules, e.g., for performing communications over one or more networks. The networks may be any of a variety of types of networks, including LANs, WANs, wired or wireless networks, having any of a variety of topologies. The signaling servers and MCUs may be located in the same location or in different locations, as desired, according to various embodiments.

Each MCU may independently include signaling and media support capability; for example, the MCUs may be implemented according to any of the above-described embodiments for providing high availability conferencing and/or large scale videoconferencing by an MCU. Alternatively, the MCUs may be implemented in other ways, as desired; however, each MCU may at least include media support capabilities (e.g., at least one media server).

The signaling servers may include a first signaling server and a second signaling server. The first signaling server may initially act as a passive scale server and the second signaling server may initially act as an active scale server. The active scale server may facilitate conference signaling between endpoints and MCUs, while MCUs may provide media support for conferences between the endpoints.

Facilitating conference signaling between endpoints and MCUs may include a variety of functions, according to various embodiments. For example, the active scale server may register media servers, dial and/or receive calls with endpoints, select media servers to provide media support for conferences for the endpoints, and monitor the media servers for failure. In addition, the active scale server may host a scheduler (e.g., a scheduler program executing on the active scale server) and/or schedule data, and may maintain call context information for conferences hosted by the cluster. Some or all of these functions may be duplicated and/or backed up by the passive scale server. For example, the active scale server may periodically or continuously back up schedule information, current utilization port information for each MCU, and/or call context data to the passive scale server, in some embodiments, while the passive scale server may maintain such information.

The first and second signaling servers may have similar (or identical) capabilities. Selection of the first signaling server as passive scale server and the second signaling server as active scale server may be performed in any of a variety of ways; one possible way includes automatic mutual negotiation. The active scale server may be awarded a first floating IP address, which may server as a contact address for the cluster. For example, as the active scale server, the second signaling server's MAC address may be associated with the first floating IP address.

The passive scale server may monitor the active scale server. In some embodiments, the active scale server may also monitor the passive scale server. For example, the active and passive scale servers may keep heartbeats (e.g., periodically provide "heartbeat" signals, indicating that they remain "alive") with each other. Thus, if the second signaling server fails, the first signaling server may detect that the second signaling server has failed. In response to detecting that the second signaling server has failed, the first signaling server may take over the role of active scale server, including facilitating conference signaling between the endpoints and the media servers. In order to assume the role of active scale server, the first signaling server may capture the first floating IP address. This may include updating a MAC address associated with the first floating IP address to be the MAC address of the first signaling server, where previously the second signaling server's MAC address may have been associated with the first floating IP address.

Since the first signaling server may have up-to-date call context, schedule, and MCU capability and port utilization information (e.g., as maintained while acting as passive scale server), the first signaling server may seamlessly take over facilitation of conference signaling between the endpoints and the media servers, potentially without any interruption or noticeable difference to the end-users participating at the endpoints.

As noted above, the active scale server (e.g., either the first signaling server after failure of the second signaling server, or the second signaling server prior to its failure) may register, assign media support duties to, and monitor the MCUs as part of conference signaling facilitation.

According to some embodiments, during registration of an MCU, the MCU may provide information regarding the location and capabilities of the MCU. The active scale server may assign a respective floating IP address to each respective MCU upon registration, which the MCU may assume in addition to its actual IP address. The respective floating IP address of the MCU may be provided as a media contact address for any conferences for which the MCU provides media support.

Once an MCU has registered with the active scale server (and thus joined the cluster), the MCU may drop any signaling capabilities it has, e.g., in favor of the active scale server. For example, while an MCU may have an internal signaling engine, as a slave MCU in the cluster, the MCU may not use its internal signaling engine, and may effectively function as a media server (or a plurality of media servers, in some embodiments) which provides media support functions (e.g., encoding, decoding, mixing, and/or compositing of media streams) for conferences while relying on the active scale server to provide signaling support functions.

As part of (or in response to) establishing a call with an endpoint, the active scale server may select a media server to provide media support for the endpoint. Selecting a media server to provide media support for an endpoint may be performed in any of a variety of ways and based on any of a variety of factors. For example, availability of media servers (e.g., based on capacity and current port utilization), locations of available media server(s) and/or endpoint(s) involved, and/or other factors may be considered, e.g., in order to make optimal use of media resources and efficiently use network bandwidth. As noted above, once selected to provide media support for a conference, a media server's assigned floating IP address may be used as its media contact address.

In some embodiments, a first media server may fail. The active scale server may detect this failure. For example, the active signaling server may be monitoring the first media server (and all of the media servers in the cluster), by tracking heartbeat signals from the media servers, periodically pinging the media servers, or in any of a variety of ways. Based on detecting that the first media server has failed, the active scale server may reassign a floating IP address from the first media server to a second media server. The active scale server and/or the second media server may accordingly update a MAC address associated with the reassigned floating IP address from the first media server's MAC address to the second media server's MAC address. After being assigned the floating IP address previously assigned to the first media server, the second media server may provide media support for conferences previously supported by the first media server. Endpoints participating in the conferences previously supported by the first media server may remain connected to the conferences during reassigning of the floating IP address from the first media server to the second media server.

More generally, conferences may be moved from one media server to another media server for reasons other than failure of a media server, if desired. For example, a conference may be moved from one media server to another for load balancing or bandwidth optimization reasons. Thus, in one embodiment, endpoints participating in a conference may be moved from a first media server to a second media server because the second media server is located in closer proximity to a majority of endpoints participating in the conference than the first media server. Alternatively, the endpoints may be moved in order to free up capacity on the first media server to support a conference whose endpoints are mostly located in closer proximity to the first media server, or a larger conference for which only the first media server has sufficient capacity to provide complete support.

BRIEF DESCRIPTION OF THE DRAWINGS

A better understanding of the present invention may be obtained when the following detailed description is considered in conjunction with the following drawings, in which.

Figure 1:
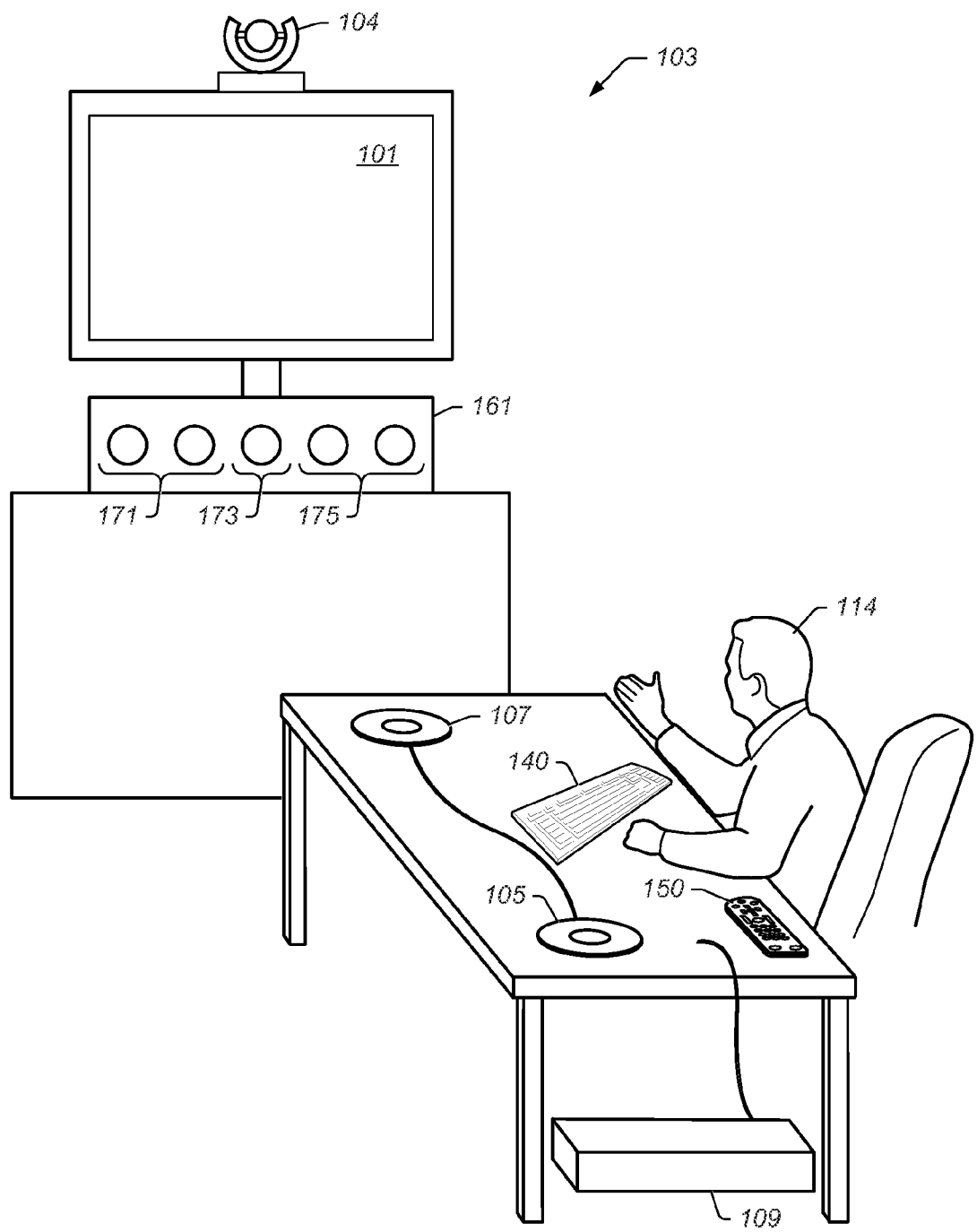
FIGS. 1 and 2 illustrate exemplary videoconferencing system participant locations, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing System which Allows Endpoints to Perform Continuous Presence Layout Selection", Ser. No. 12/142,302, whose inventors are Keith C. King and Wayne E. Mock, is hereby incorporated by reference in its entirety as though fully and completely set forth herein.

U.S. patent application titled "Video Conferencing Device which Performs Multi-way Conferencing", Ser. No. 12/142,340, whose inventors are Keith C. King and Wayne E. Mock, is hereby incorporated by reference in its entirety as though fully and completely set forth herein.

U.S. patent application titled "Video Decoder which Processes Multiple Video Streams", Ser. No. 12/142,377, whose inventors are Keith C. King and Wayne E. Mock, is hereby incorporated by reference in its entirety as though fully and completely set forth herein.

U.S. patent application titled "Virtual Multiway Scaler Compensation", Ser. No. 12/171,358, whose inventors are Keith C. King and Wayne E. Mock, is hereby incorporated by reference in its entirety as though fully and completely set forth herein.

U.S. patent application titled "Virtual Distributed Multipoint Control Unit", Ser. No. 12/712,947, whose inventors are Keith C. King, Ashish Goyal, and Hrishikesh Gopal Kulkarni, is hereby incorporated by reference in its entirety as though fully and completely set forth herein.

U.S. patent application Ser. No. 13/093,948, titled "Recording a Videoconference Based on Recording Configurations", filed Apr. 26, 2011, whose inventors were Ashish Goyal and Binu Kaiparambil Shanmukhadas, is hereby incorporated by reference in its entirety as though fully and completely set forth herein

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:

FIGS. 1 and 2—Exemplary Participant Locations

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference. In some embodiments, images acquired by the camera 104 may be encoded and transmitted to a multipoint control unit (MCU), which then provides the encoded stream to other participant locations (or videoconferencing endpoints)

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on the floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system, or to an MCU for provision to other conferencing systems. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, the codec 109 may implement a real time transmission protocol. In some embodiments, the codec 109 (which may be short for "compressor/decompressor" or "coder/decoder") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may utilize MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

Note that the videoconferencing system shown in FIGS. 1 and 2 may be modified to be an audioconferencing system. For example, the audioconference could be performed over a network, e.g., the Internet, using VOIP. The audioconferencing system, for example, may simply include speakerphones 105/107, although additional components may also be present. Additionally, note that any reference to a "conferencing system" or "conferencing systems" may refer to videoconferencing systems or audioconferencing systems (e.g., teleconferencing systems).

Figure 3:
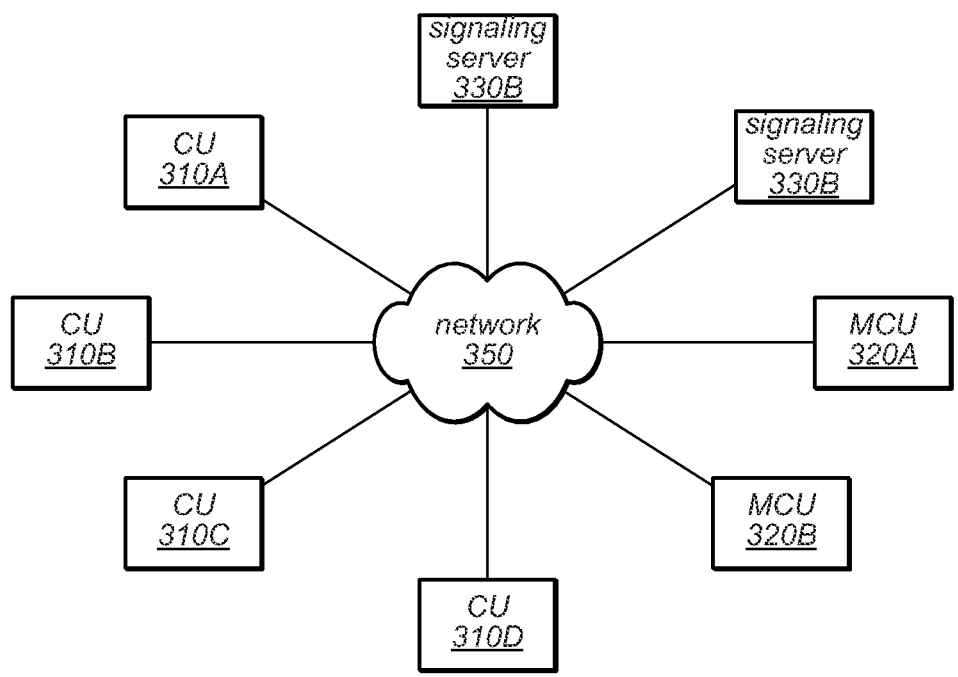
FIG. 3 illustrates exemplary conferencing systems coupled in different configurations, according to some embodiments.

FIG. 3—Coupled Conferencing Systems

FIG. 3 illustrates a configuration of conferencing systems coupled according to one embodiment. As shown in FIG. 3, conferencing units (CUs) 310A-D (e.g., videoconferencing systems 103 described above) may be connected via network 350 (e.g., a local area network or a wide area network such as the Internet). In addition, multipoint control units (MCUs) 320A-B and signaling servers 330A-B may be coupled to the network 350. The network may be any type of network (e.g., wired or wireless, circuit-switched or packet-switched) or combination of networks as desired.

Each CU 310 may be configured to place or receive calls with other conferencing systems in order to establish conferences between different CUs 310. Note that "calling" in this context may include initiating contact via any of a variety of means and using any of a variety of communication protocols, such as dialing a PSTN telephone number, contacting an IP address, etc. Any of a variety of protocols may be used for the calls and with respect to the one or more networks, including real-time transport protocol (RTP), integrated services digital network (ISDN), H.323, session initiation protocol (SIP), etc.

In some embodiments, a CU 310 may be capable of calling other CUs directly, e.g., to establish a two-way conference. Additionally, in some embodiments, CUs 310 may be configured to participate in multi-way conferences, e.g., with multi-way media support. According to one set of embodiments, the multi-way media support might be provided by an MCU. For example, an MCU might include one or more media engines (which may be media servers), which may each have a certain number of ports (which may be logical ports and/or physical ports) and may provide media support services such as encoding, decoding, mixing, and compositing for video and/or audio streams which may be received and/or transmitted via the ports of the media engines, among other possible media support services.

In some embodiments, in order to receive calls and host a multi-way conference, certain signaling capabilities may be required. Thus, an MCU may also include a signaling engine (which may be a signaling server), which may be capable of receiving and dialing calls including handling protocol negotiations (e.g., RTP, SIP, H323, etc), hosting conferences (e.g., including maintaining conference state information), among other possible signaling services. In some embodiments, the signaling server may also host a scheduler (e.g., may execute a scheduling program) which may manage scheduling of conferences for hosting on the MCU.

In some embodiments, a signaling server may be capable of facilitating signaling for multiple MCUs. The signaling server may be comprised in one MCU and may be selected (by any of a variety of methods) to provide signaling for multiple MCUs including the MCU in which the signaling server is comprised, or may be a dedicated signaling server (e.g., which does not include media support capabilities/ which only provides signaling support). For example, signaling servers 330A-B may be dedicated signaling servers, while MCUs 320A-B may include signaling engines in addition to media engines (or may include only media engines).

In some embodiments, a plurality of MCUs 320 and signaling servers 330 may form a cluster. Some or all of the MCUs 320 and signaling servers 330 may be located in a single location (e.g., a server farm), and/or may be coupled via a LAN. Alternatively, one or more MCUs 320 and signaling servers 330 may be located in different locations; for example, one or more MCUs 320 might be located in each of multiple cities. In this case some or all of the MCUs 320 and signaling servers 330 may be coupled via a WAN. Providing regional support for conferences in this manner may result in better use of network bandwidth and better conference performance/quality of service (e.g., lower latency, less jitter, etc.), particularly in combination with a conferencing infrastructure which can effectively manage media resources in a location-aware manner, such as according to embodiments of the systems and methods described herein.

Generally speaking, by separating the signaling and media components of a call, control of individual media streams may be facilitated in a manner that is particularly effective at providing scalability and high availability. Accordingly, some embodiments of the present disclosure relate to a system and method relating to separate signaling and media engines in an MCU. Further embodiments relate to a system and method in which one or more separate, dedicated signaling servers support signaling for multiple MCUs, which may provide a further level of reliability in multi-way conferencing. Additionally, as noted above, such a system may provide excellent use of media resources and network bandwidth by taking advantage of location awareness, in some embodiments.

FIGS. 4-7—Call Movement in a Bank of Media Servers

FIGS. 4-7 relate to a system and method that provides for call movement within a bank of media servers, according to one set of embodiments. As noted above, by separating signaling from media in a conference hosting context, individual streams (e.g., of participants in the conference) may be more precisely controlled in order to provide improved scalability and availability, among other improvements, relative to implementations in which signaling and media hosting are combined.

The logical separation of signaling from media hosting can be provided at any or all of multiple infrastructure levels. For example, at the MCU level, an MCU could be configured to include separate signaling and media engines. Thus, an internal signaling server in the MCU could handle conference hosting including receiving and/or dialing calls, handling protocol negotiations, scheduling, maintaining conference state/context information, etc. One or more media servers in the MCU could each be capable of encoding, decoding, mixing, compositing, and/or performing other media support functions for participant media streams.

Note that an MCU may be configured in any of a variety of ways to include separate media and signaling components. As one example, an MCU may include a chassis, which may for example provide a system bus. The chassis may include a plurality of slots, into which a plurality of (e.g., modular) racks and/or cards may be inserted to provide the signaling server, media server, and/or other capabilities. In this way media support capability may be easily expanded by adding additional modular units. In some embodiments multiple chassis may be connected, either by a system bus (e.g., an expansion bus) or other type of connection. Alternatively, one or more media servers and/or a signaling server may be permanently installed within a housing to provide a stand-alone system, according to some embodiments. Other modular or stand-alone systems, or combinations thereof, are also possible. It is also possible that an MCU may provide physically integrated media and signaling engines, and that the separation of media and signaling functionality may be logical only, although according to some embodiments, this may negate some of the advantages of separating the components. The MCU may include a single MAC address and route data internally via an internal bus, or in some embodiments may include multiple MAC addresses (e.g., such that individual components may be able to access a network independently).

In a similar manner, at a cluster level, a plurality of MCUs having media support capability could rely on a signaling server to support conference signaling. Note that according to some embodiments, FIGS. 4-7 and the description provided with respect thereto may relate primarily to MCU level implementations, while FIGS. 8-9 and the description provided with respect thereto may relate primarily to cluster level implementations. However, it should be recognized that some or all of the aspects described with respect to one implementation level may be used at either or both implementation levels, according to various embodiments.

By ceding control of signaling to a signaling server, movement of a media stream from one media server to another media server may be greatly facilitated. In particular, according to some embodiments, movement of a media stream from one media server to another media server may be performed in a manner that is substantially transparent to the end user. For example, according to one set of embodiments, if a media server fails, the signaling server may be capable of moving media streams from that media server to a different media server such that the endpoints involved remain connected to their conference(s) and experience minimal or no disruption to their conference(s).

Figure 4:
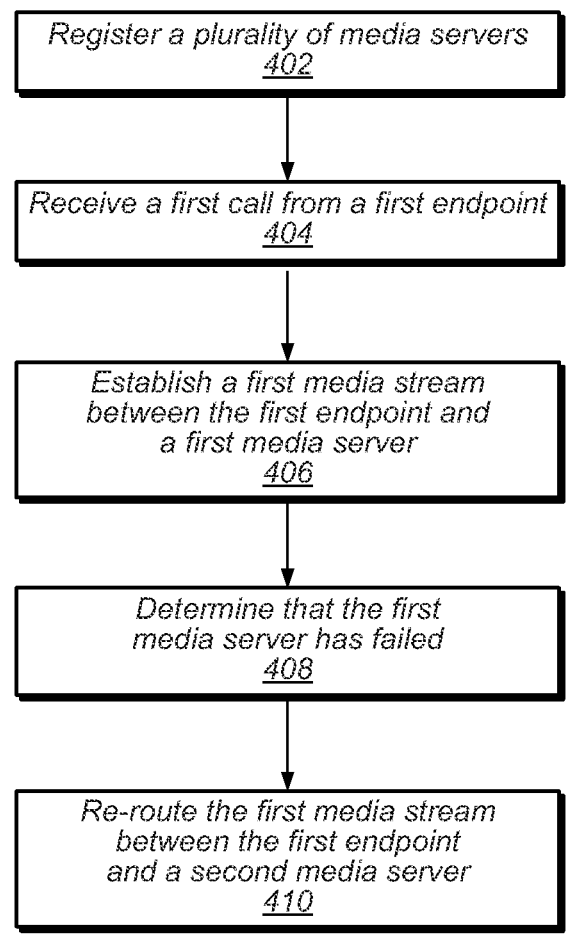
FIG. 4 is a flowchart diagram illustrating an embodiment of a method for providing call movement within a bank of media servers in a fail-over context according to one set of embodiments.

FIG. 4 is a flowchart diagram illustrating the steps of such a method for providing conferencing using separate signaling and media support components according to one set of embodiments. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a signaling server may register a plurality of media servers. Each of the media servers may have certain capabilities with respect to providing media support. For example, a media server may have a certain number of ports (e.g., 4, 5, 6, 8, 12, etc). Each port may be capable of receiving, decoding, mixing, compositing, encoding, and/or transmitting media streams. The ports may be logical ports according to some embodiments; for example, a number of ports of a media server may correspond to a number of media streams which its hardware is capable of supporting, rather than a number of physical input/output ports. The ports may also be physical ports in some embodiments.

A media server may be configured to provide media support for a conference by receiving individual media (e.g., audiovisual) streams from each endpoint of the conference, decoding the media streams, mixing the audio and compositing the video streams, encoding the mixed/composited streams, and transmitting the mixed/composited streams to the endpoints. Other media support functions, and/or variations on the above described media support functions, are also possible, as will be recognized by those skilled in the art in light of this disclosure.

As part of registering the plurality of media servers, the signaling server may store capability information for each of the media servers. For example, the signaling server may store information indicating a number of ports of each media server, and/or other information indicative of a media server's media support capability. The signaling server may also store other information for each media server, such as information indicating current port utilization (e.g., how many ports of the media server are in use and/or how many ports of the media server are available), information indicating which endpoints are connected to which ports of a media server, call state and/or context information for conferences for which a media server provides media support, etc.

In 404, the signaling server may receive a first call from a first endpoint. Alternatively, the signaling server may dial the first call out to the first endpoint (e.g., based on conference scheduling information) rather than receive the first call from the first endpoint. The signaling server may handle protocol negotiations with the first endpoint and/or provide other signaling support functions.

The signaling server may select a first media server to provide media support for the first call. The first media server may be selected based on any of a variety of criteria, as desired, including but not limited to current capacity of available media servers, expected number of ports required for the conference in which the first endpoint participates, location of the endpoint and/or other endpoints in the conference and/or other endpoints in other conferences, and/or whether a media server is already hosting a conference in which the first endpoint is to participate. According to one set of embodiments, the signaling server may determine the locations of some or all of the endpoints in a conference and may select a media server to provide media support for the conference based on those locations (e.g., based on a majority of the endpoints being located in a particular region, for example). This may improve bandwidth utilization, e.g., by minimizing WAN usage, in some embodiments.

In 406, a first media stream may be established between the first endpoint and the first media server. The first media server may provide media support for a conference in which the first endpoint is participating. For example, the first media server may perform decoding, mixing, compositing, and/or encoding of media stream(s) received from the first endpoint and other endpoints participating in the same conference, and provide a conference media stream to each endpoint participating in the conference. Note that the conference media stream provided to each endpoint may be different in some embodiments; for example, in one set of embodiments, each endpoint in the conference may receive a conference media stream which excludes audio and/or video received from that endpoint.

Thus, the first media stream may include an audio stream and/or a video stream from the first endpoint to the first media server, and/or an audio stream and/or a video stream from the first media server to the first endpoint. The media stream from the first endpoint to the first media server may include audio and/or video from one or more participants located at the first endpoint. The media stream from the first media server to the first endpoint may include audio and/or video from the conference in which the first endpoint is participating, which may include mixed audio and/or composited video from one or more participants located at endpoints participating in the conference.

According to various embodiments, the first media stream may be established between the first endpoint and the first media server in one or more of multiple possible ways. In some embodiments, this may depend on the nature of the communication protocol used.

For example, according to one set of embodiments, the signaling server may include a media router. In this case, the first media stream may flow into the signaling server and subsequently be routed to the first media server. This technique may be appropriate for real-time protocol (RTP) packet streams according to some embodiments.

Alternatively, or in addition, the signaling server may direct the first endpoint and/or the first media server to establish a peer-to-peer media session, in which case the first media stream may not flow into (e.g., may bypass) the signaling server. This technique may be appropriate for session initiation protocol (SIP) and/or H323 packet streams according to some embodiments.

As noted above, a plurality of media servers may be registered to the signaling server. Accordingly, the signaling server may receive or dial any number of additional calls, select media servers to provide media support for each call, and establish one or more media streams between endpoints and media servers for each call. In this way, the signaling server may host any number of conferences, facilitating signaling for each conference while the plurality of media servers provide media support for the conferences.

The signaling server may monitor or track each media server for which it provides signaling support. Monitoring may be performed via a number of different mechanisms. For example, the signaling server may periodically send signals that require a response (e.g., "ping") from the corresponding media server, e.g., every 100 ms, 500 ms, 1 second, 30 seconds, 1 minute, etc. Alternatively, or additionally, the media servers being monitored may send "heartbeat" signals to the signaling server performing the monitoring, e.g., at similar rates to the signal described above. Accordingly, in one embodiment, the method may determine whether or not a media server is still active based on whether a response or heartbeat signal is received during an expected time window (e.g., a response is sent within 50 ms, 100 ms, 500 ms, 1 second, 5 seconds, etc. or the heartbeat signal is received at or near the scheduled time, within similar thresholds). If no response or heartbeat is received during the expected time window, the signaling server may determine that a media server is not active (e.g., because the media server has failed, or for another reason). Other mechanisms are also possible.

In 408, the signaling server may determine that the first media server has failed. Based on determining that the first media server has failed, the signaling server may select a new ("second") media server to provide media support to endpoints which were previously supported by the first media server, such as the first endpoint. The second media server may be selected based on any of a number of criteria, including port availability, locations of endpoints previously supported by the first media server and/or locations of endpoints currently supported by the second media server, overall media server capacity, current or future scheduling requirements, etc.

In 410, the first media stream may be re-routed between the first endpoint and the second media server. In other words, the call may be "moved" from the first media server to the second media server. Re-routing the first media stream may be performed in different ways, e.g., depending on the protocol used, according to some embodiments. For example, if the first media stream is an RTP stream and is being routed through the signaling server, the signaling server may update its configuration settings to route the first media stream to the second media server. As another example, if the first media stream is an SIP stream or H.323 stream which has been established as a peer-to-peer connection between the first media server and the first endpoint, the signaling server may communicate the change of media attributes to the endpoints using SIP or H.323 defined mechanisms for updating media attributes.

Similarly, any other media streams for which the first media server provided media support may be re-routed to flow from their respective endpoints to the second media server. Note, though, that according to some embodiments, media streams which were originally supported by the first media server may be distributed among multiple other media servers in addition to the second media server. For example, if the first media server were providing media support for two different conferences, media streams from endpoints participating in one conference might be re-routed to the second media server, while media streams from endpoints participating in the other conference might be re-routed to a third media server.

Note that the above described mechanism may be accomplished relatively rapidly and may have minimal or no impact on the end users in some embodiments. For example, in some embodiments, endpoints may remain connected to their conferences during call movement (e.g., may not need to reconnect to their conferences) and may experience an interruption or gap in media support for less than two seconds. In other embodiments, the gap may be approximately one second, 500 ms, three seconds, or any other number.

Figure 5A:
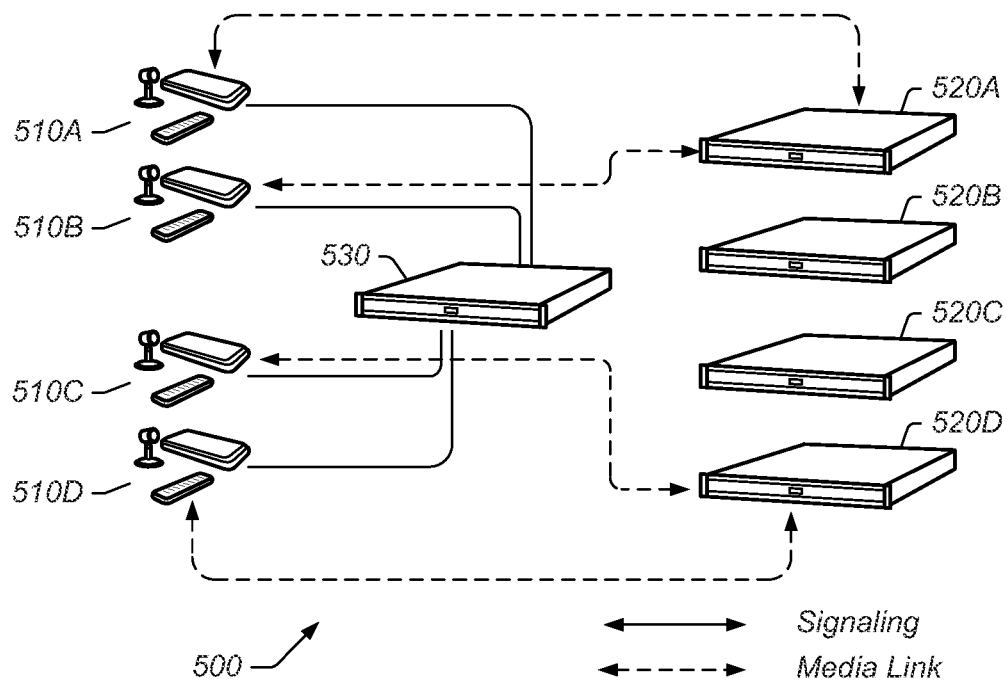
FIGS. 5A-5B illustrate an exemplary call movement implementation in a fail-over context according to one set of embodiments.
Figure 5B:
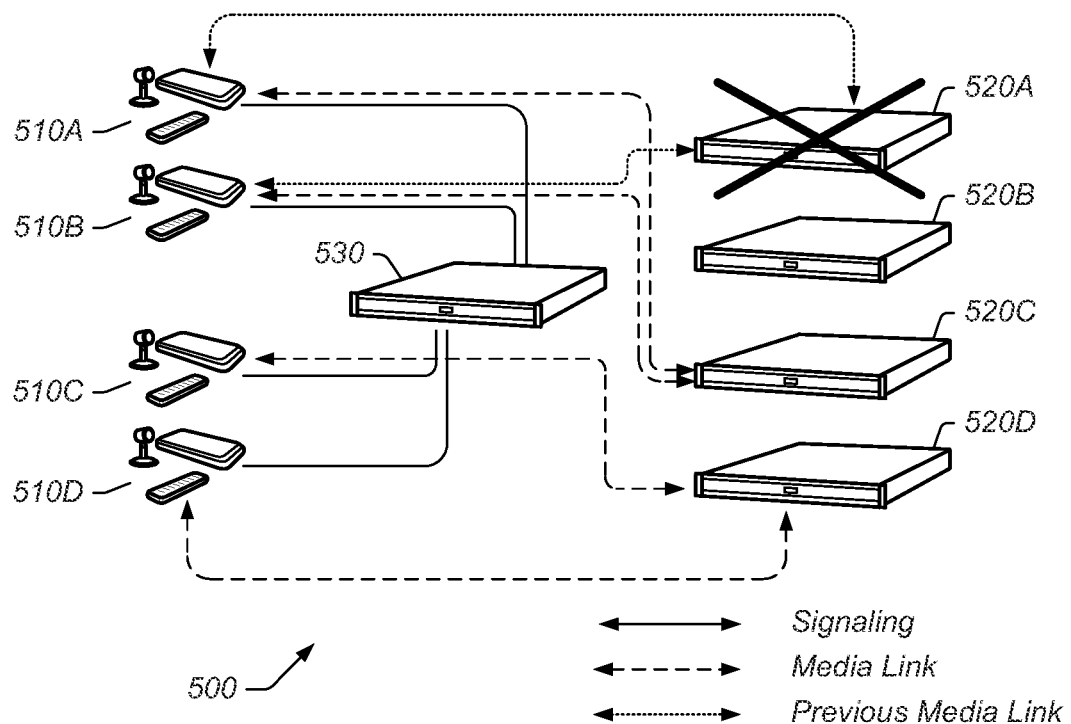

FIGS. 5A-5B illustrate an exemplary system 500 in which a signaling server supports call movement within a bank of media servers according to one set of embodiments. As shown, the system may include a plurality of endpoints 510A-D, a plurality of media servers 520A-D, and a signaling server 530.

Initially, as shown in FIG. 5A, the signaling server 530 may host/provide signaling support for each of the endpoints 510A-D. Endpoints 510A-B may be participating in a conference for which media support is provided by media server 520A, while endpoints 510C-D may be participating in a conference for which media support is provided by media server 520D.

As shown in FIG. 5B, if media server 520A fails, media links which previously linked endpoints 510A-B to media server 520A may be modified to link endpoints 510A-B to media server 520C. Signaling server 530 may be responsible for detecting the failure of media server 520A and re-routing the media streams from endpoints 510A-B to media server 520C.

Figure 6:
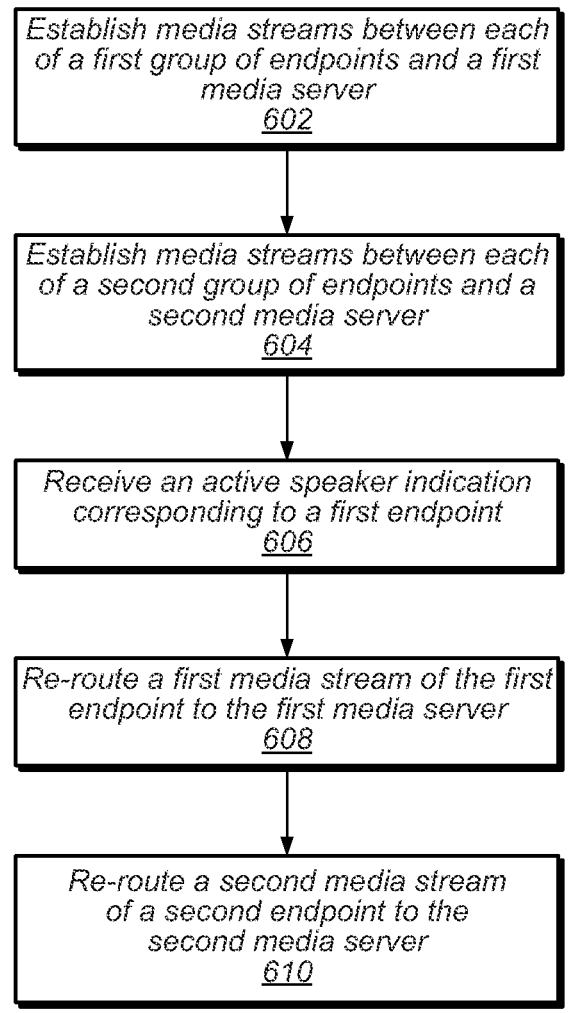
FIG. 6 is a flowchart diagram illustrating an embodiment of a method for providing call movement within a bank of media servers in a large scale conferencing context according to one set of embodiments.

FIGS. 6-7 relate to further embodiments of a system and method that provides for call movement within a bank of media servers, according to one set of embodiments. In particular, FIGS. 6-7 relate to a system and method for providing a large-scale conference using the call movement capabilities supported by the separation of signaling functions from media support functions.

Considering the typically limited number of ports provided by an MCU, when a large single conference is desired, it is common that a single MCU may not have the capacity (e.g., hardware capacity) to support the conference. It may be possible, in this case, for multiple MCUs to cascade together by establishing a call between the MCUs. This approach effectively increases the number of ports available in a single conference, but results in an undesirable "window-in-window" effect. This effect is generally considered unpleasant and represents an approach that is less than ideal.

However, by leveraging the capacity for seamless (or substantially seamless) call movement made possible by separating signaling and media engines in an MCU, two or more media servers may be utilized in a manner that does not require the window-in-window effect and may present a substantially seamless view of a single conference to the end user.

FIG. 6 is a flowchart diagram illustrating the steps of such a method for providing a large scale conference using separate signaling and media support components according to one set of embodiments. The method shown in FIG. 6 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 602, media streams may be established between each of a first group of endpoints and a first media server. A signaling server may establish the media streams between each of the first group of endpoints and the first media server, such as according to the steps outlined with respect to the method of FIG. 4, according to some embodiments.

The first media server may serve as an "active" media server. As the active media server, the first media server may receive the media streams from the first group of endpoints, decode each stream, mix audio and/or composite video from some or all of the media streams from the first group of endpoints (e.g., the n-most active participants, where n may be configurable) to produce a "conference media stream", encode the conference media stream, and transmit the conference media stream to each endpoint in the first group of endpoints. The endpoints comprised in the first group of endpoints may be the most active speakers in the conference, according to one set of embodiments. Speaker activity may itself be determined in any of a variety of ways, including instantaneous or accumulated speaker volume or audio energy, movement (agitation), participant/endpoint self- or group-selection, etc. Other mechanisms for determining which endpoints are comprised in the first group of endpoints are also possible.

In 604, media streams may be established between each of a second group of endpoints and a second media server. The signaling server may establish the media streams between each of the second group of endpoints and the second media server, such as according to the steps outlined with respect to the method of FIG. 4, according to some embodiments.

The second media server may serve as a "passive" media server. As the passive media server, the second media server may receive the media streams from the second group of endpoints and may monitor the media streams from the second group of endpoints for activity (which may be defined as desired, such as according to any of the ways noted above). The second media server may also forward or replicate the conference media stream to each endpoint in the second group of endpoints, such that each endpoint in the second group of endpoints receives the conference media stream.

In the event that one of the endpoints comprised in the second group of endpoints should become an active speaker, an active speaker indication may be generated. Generating the active speaker indication might be based on an endpoint having an activity level that is greater than a certain threshold, and/or having a greater activity level than one of the endpoints comprised in the first group of endpoints. The second media server may generate the active speaker indication based on monitoring the media streams from the second group of endpoints for activity, and may notify the first media server and/or the signaling server of the activity.

In some embodiments, in order to provide media support for a greater number of endpoints, the second media server may provide only limited media support to the second group of endpoints. For example, only audio (or only video) streams might be received by the second media server from the second group of endpoints. These limited streams may, for example, be used solely to detect voice activity from endpoints in the second group of endpoints. However, in other embodiments, full media support may be provided to the second group of endpoints by the second media server; for example, in some embodiments it may be desirable to use a combination of audio and video activity detection to determine that an endpoint has become an active speaker.

In 606, the signaling server may receive an active speaker indication corresponding to a first endpoint. The first endpoint may be comprised in the second group of endpoints; for example, the first endpoint may previously have been a passive participant in the conference. The active speaker indication may have been generated by the second media server, e.g., based on monitoring audio and/or video streams received from the first endpoint and determining that the first endpoint has an active speaker. The active speaker indication may then have been transmitted to the signaling server.

In 608, a first media stream of the first endpoint may be re-routed to the first media server. Since the first endpoint has an active speaker, it may be desirable for the first media stream to be included (e.g., mixed/composited) in the conference media stream. Thus, the signaling server may "move" the first endpoint to the first (active) media server. Re-routing may be performed by the signaling server in a similar manner as described with respect to the method of FIG. 4, according to some embodiments. After the first media stream has been re-routed to the first media server, the first endpoint may be comprised in the first group of endpoints.

The first media server may have a limited capacity (e.g., a limited number of ports) for providing media support to endpoints. If the first media server is not at capacity, the first endpoint may be moved to an open port of the first media server. However, if the first media server is already at its capacity when the first endpoint becomes an active speaker and is moved to the first media server, an endpoint may need to be moved away from the first media server in order to provide support for the first endpoint at the first media server (e.g., to open up a port of the first media server for the first endpoint).

Thus, according to some embodiments, in 610, a second media stream of a second endpoint may be re-routed to the second media server. The second endpoint may have been comprised in the first group of endpoints, e.g., may have previously have been an active speaker. However, in order for the first media server to provide media support for the first endpoint, the second endpoint may be selected to be moved to the second media server. The second endpoint may be selected to be moved because it has become substantially passive (e.g., has a speaker activity threshold below a certain threshold or has a longest length of time since last activity), because it is a least active endpoint of the first group of endpoints, and/or has a lower speaker activity level than the first endpoint.

Re-routing the second endpoint may be performed by the signaling server in a similar manner as described with respect to the method of FIG. 4, according to some embodiments. After the second media stream has been re-routed to the second media server, the second endpoint may be comprised in the second group of endpoints.

Further changes in speaker activity level of various endpoints may result in further call movement. Thus, as different participants located at different endpoints take turns as active speakers, calls may be moved to and from the "active" first media server and the "passive" second media server such that at any given time, those endpoints which are most active are in the first group of endpoints, and the media streams of the most active endpoints may be mixed/composited by the first media server and provided to all endpoints participating in the conference. Similarly, those endpoints where are not active (or not as active) may be in the second group of endpoints, and the media streams of the less active endpoints may not be mixed/composited or provided to all endpoints participating in the conference.

Because the endpoints may remain connected to the conference (e.g., signaling between the endpoints and the signaling server may be uninterrupted) during call movement, little or no interruption may be noticed by the participants at the various endpoints when an endpoint is moved from the active conference to the passive conference or vice versa, according to some embodiments.

Figure 7B:
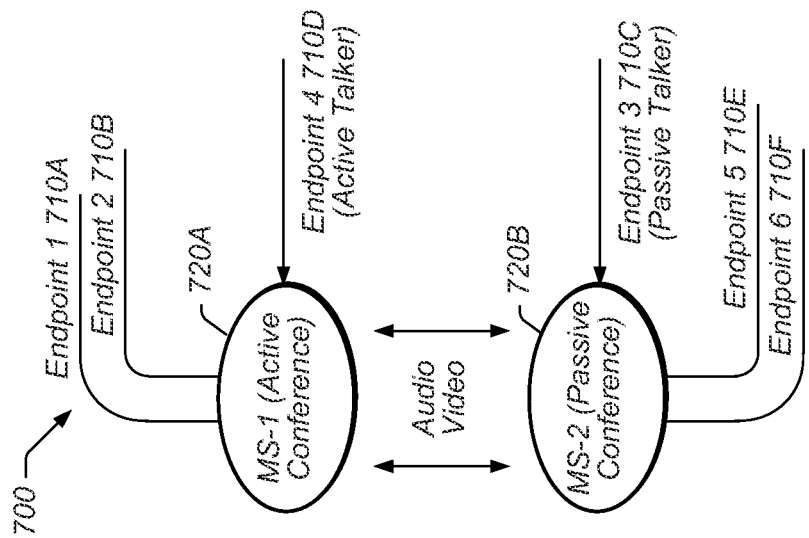
FIGS. 7A-7B illustrate an exemplary call movement implementation in a large scale conferencing context according to one set of embodiments.
Figure 7A:
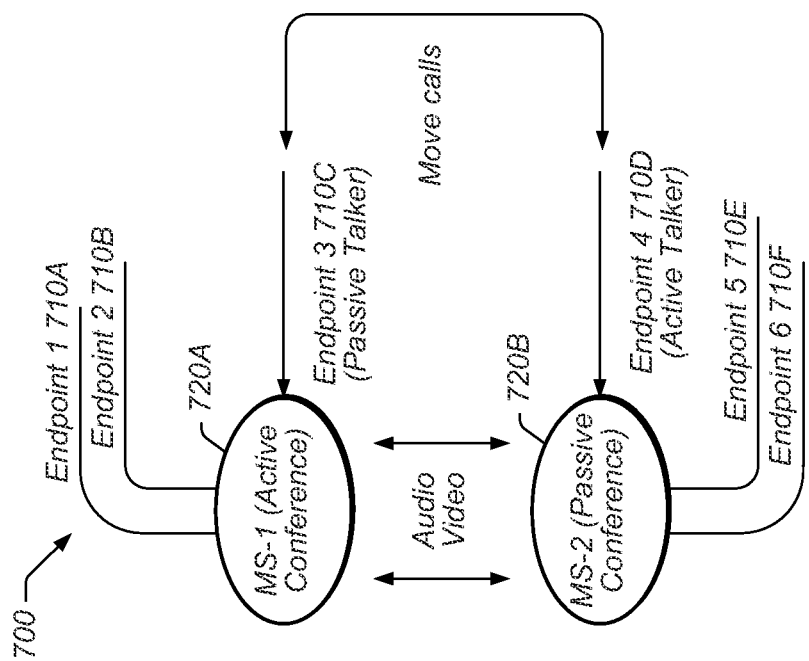

FIGS. 7A-B illustrate an exemplary system 700 in which separate signaling and media components leverage call movement capability to provide a large-scale conference according to one set of embodiments. As shown, the system may include a first media server 720A ("MS-1") and a second media server 720B ("MS-2"). The first media server may be the active media server, while the second media server may be the passive media server. A first group of endpoints (initially endpoints 1-3 710A-C, as shown in FIG. 7A) may have media links established with the first media server, while a second group of endpoints (initially endpoints 4-6 710D-F, as shown in FIG. 7B) may have media links established with the second media server. The first and second media server may also have media links. A signaling server (not shown) may provide signaling support for the media servers and endpoints involved in the conference. Any number of additional endpoints may also have media links to the first or second media server, e.g., depending on the capacity of each of the first and second media server and/or the number of endpoints participating in the conference. Additionally, one or more other media servers may also provide passive conferencing support (similar to that provided by the second media server) for any number of additional endpoints, e.g., in order to provide media support for a greater number of endpoints than the first and second media servers are capable of supporting.

In FIG. 7A, endpoint 3 710C may be a least active participant among the first group of endpoints. Meanwhile, endpoint 4 710D may have just become an active speaker. The second media server 720B may detect that endpoint 4 710D has become active (e.g., based on media stream(s) received from endpoint 4 710D) and may generate an active speaker indication. The active speaker indication may be provided to the signaling server.

As a result, the signaling server may move endpoint 4 710D from the second media server 720B to the first media server 720A, and may move endpoint 3 710C from the first media server 720A to the second media server 720B. The result of this move is illustrated in FIG. 7B. As shown, endpoint 4 710D is part of the first group of endpoints which are part of the "active conference" whose media is hosted by the first media server, while endpoint 3 710C is part of the second group of endpoints which are part of the "passive conference" whose media is hosted by the second media server.

Figure 8:
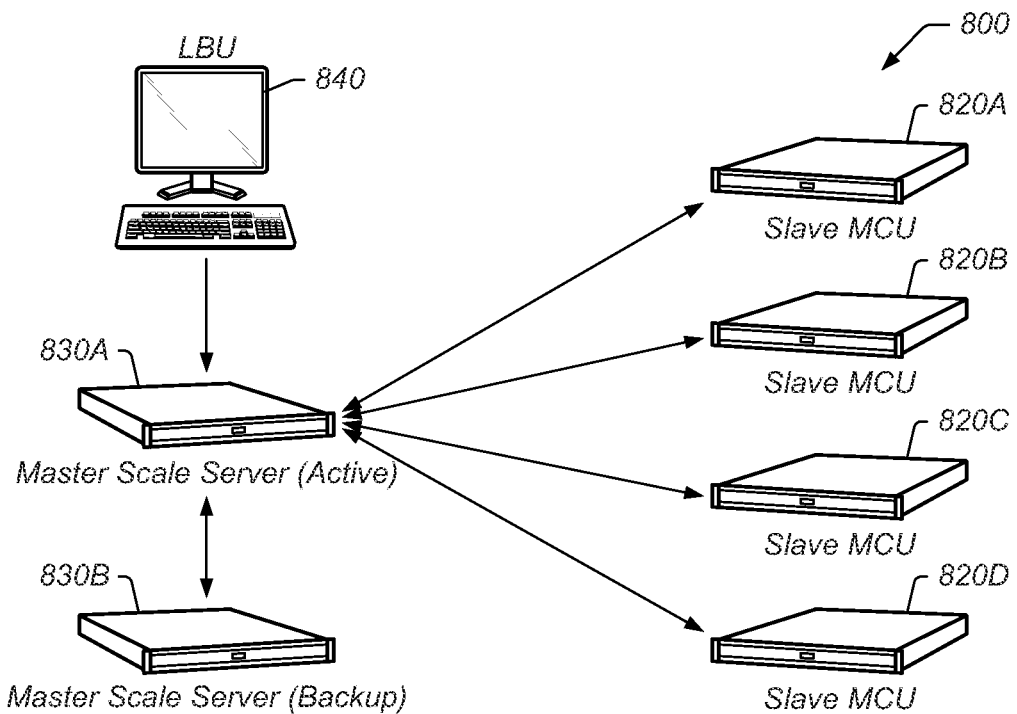
FIG. 8 illustrates a high-availability conferencing architecture according to one set of embodiments.
Figure 9:
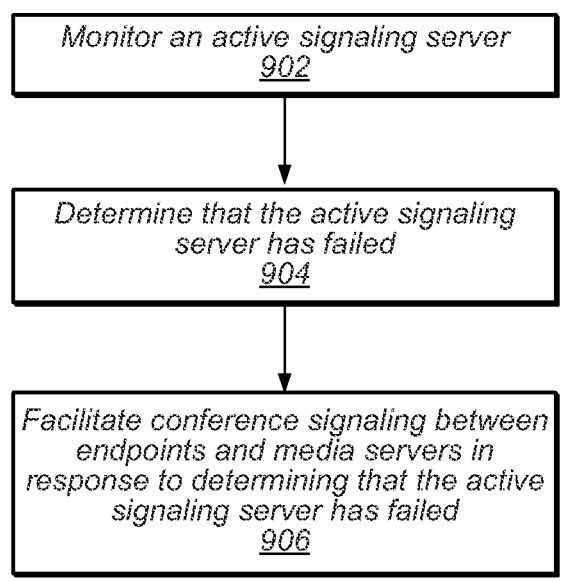
FIG. 9 is a flowchart diagram illustrating an embodiment of a method for providing high-availability conferencing according to one set of embodiments.
Figure 10:
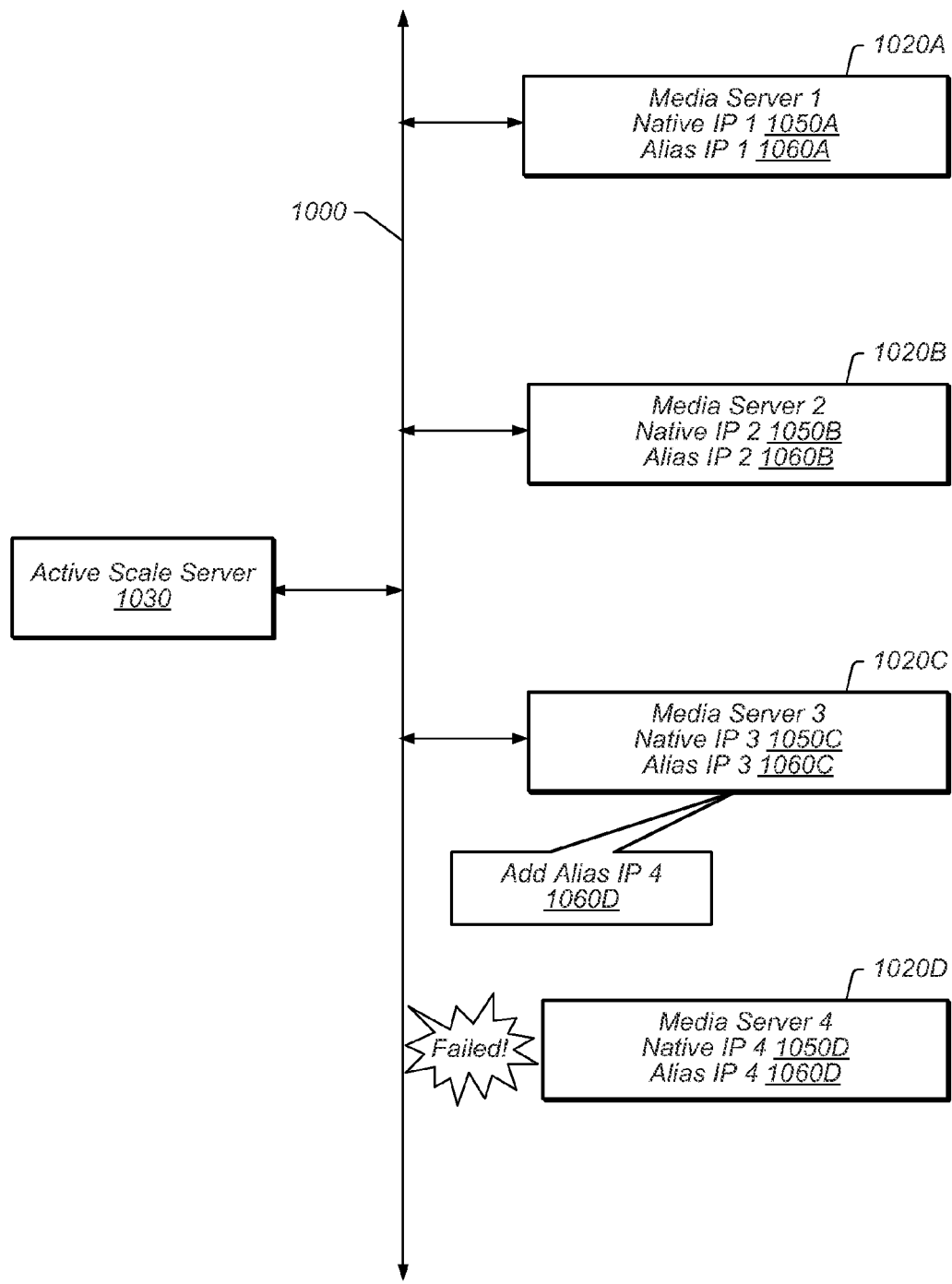
FIG. 10 is a diagram illustrating fail-over between media servers using floating IP addresses according to one set of embodiments.

FIGS. 8-10—High-Availability Conferencing Infrastructure

FIGS. 8-9 relate to a system and method that provides high-availability conferencing, according to one set of embodiments. In particular, FIGS. 8-9 relate to an architecture which provides high-availability conferencing using call-movement concepts similar to those described with respect to FIGS. 4-7 (e.g., at an MCU level) at a cluster level and with an additional level of fail-safe protection.

As described above, an MCU may be configured with separate signaling and media engines in order to provide substantially seamless call movement for fail-over, scalability, and/or other purposes. In a similar manner, at a cluster level, a plurality of MCUs having media support capability may rely on a signaling server to support conference signaling. Providing a plurality of MCUs in combination with a dedicated signaling server (also referred to as a "scale server") at the cluster level may provide even greater scalability and greater reliability/availability. Each MCU in the cluster may drop their signaling capabilities in favor of the scale server(s), thereby effectively providing an even greater bank of media servers within which calls may be moved by the scale server(s), for substantially seamless failover, greater load-balancing flexibility, and improved network bandwidth utilization, among other benefits.

In addition to the resilience built into such an architecture at the media level, it may be desirable to provide multiple scale servers, e.g., in order to provide maximum fail-safe and fail-over mechanisms. For example, according to one set of embodiments, an active scale server may manage signaling for the various media servers (e.g., slave MCUs) in the cluster, while a passive scale server may backup the active scale server and take over the signaling responsibilities which were previously provided by the active scale server in the event of failure of the active scale server.

FIG. 8 illustrates such a high-availability conferencing architecture according to one set of embodiments. As shown, the system 800 may include an active scale server 830A and a passive scale server 830B. The system 800 may also include a plurality of slave MCUs 820A-D. An external load balancer (LBU) 840 may also be provided in some embodiments.

Note that variations of the conferencing architecture shown in FIG. 8, e.g., including different numbers of MCUs and/or scale servers and/or other devices, may be used if desired. The system 800 may be coupled to a wide area network (WAN), e.g., via one or more routers, gateways, and/or other network appliances, such that endpoints (not shown) which are coupled to the WAN may establish conferencing sessions with the system 800.

FIG. 9 is a flowchart diagram illustrating the steps of a method for providing high-availability conferencing using an active and a passive signaling server as well as a plurality of media servers according to one set of embodiments. The method shown in FIG. 9 may be used in conjunction with the high-availability conferencing architecture illustrated in FIG. 8, or an alternative conferencing architecture, if desired. The method shown in FIG. 9 may also/alternatively be used in conjunction with any of the computer systems or devices shown in any other of the above Figures, among other devices. In various embodiments, some of the method elements shown may be performed concurrently, performed in a different order than shown, or omitted. Additional method elements may also be performed as desired. As shown, this method may operate as follows.

In 902, a first signaling server may monitor a second signaling server. The first signaling server may be a passive scale server, while the second signaling server may be an active scale server. Monitoring may be performed via a number of different mechanisms. For example, the first signaling server may periodically send signals that require a response (e.g., "ping") from the second signaling server, e.g., every 100 ms, 500 ms, 1 second, 30 seconds, 1 minute, etc. Alternatively, or additionally, the second signaling server may send "heartbeat" signals to the passive signaling server, e.g., at similar rates to the signal described above. In addition, in some embodiments the second signaling server may monitor the first signaling server. For example, the second signaling server and the first signaling server may keep a heartbeat with each other.

The first and second signaling servers may have similar (or identical) signaling support capabilities. The second signaling server may have been assigned the role of "active" scale server while the first signaling server may have been assigned the role of "passive" scale server. Note that additional scale servers may also be provided if desired (e.g., to provide further backup and/or active signaling support). Role assignment may be performed in any of a variety of ways. For example, according to one set of embodiments, the first and second signaling servers may undergo automatic mutual negotiation according to any of a variety of algorithms in order to select roles. Alternatively, roles may be externally assigned, e.g., by an administrator and/or a control server.

The second signaling server, as the active scale server, may be awarded an external floating IP address. In some embodiments, this IP address may be exposed as a pilot number or contact address for the cluster. In other words, according to some embodiments, all of the resources of the cluster may effectively be reached with a single contact point, e.g., via the active signaling server. This may be desirable, as it may present a simpler interface for end-users.

The active scale server may facilitate conference signaling between endpoints and media servers. As further described subsequently, this may include registering media servers, receiving calls from endpoints, handling protocol negotiations (e.g., initiating sessions) with endpoints, selecting media servers to provide media support for conferences, maintaining scheduling data and call context data for conferences, and/or monitoring the media servers for failure, among other possible facilitative functions.

Each of a plurality of media servers (e.g., MCUs) may register to the active scale server, e.g., prior to or upon joining the cluster. Registering may include providing information regarding the media server, such as capacity/capabilities (e.g., number of ports, encoding/decoding/mixing/compositing capabilities), location, MAC address, IP address, etc. Once registered to the scale server, MCUs may drop their signaling capabilities and join the cluster as a slave MCU. Once in the cluster, each slave MCU may act as a media server.

The active scale server may monitor each media server, e.g., for failure. Similar to monitoring the passive scale server (and vice versa), monitoring the media servers may be accomplished in any of a variety of ways, including pinging the media servers and receiving responses, receiving heartbeat signals, etc. For example, according to one set of embodiments, each media server may keep a heartbeat running with the active scale server.

During registration, each media server may be assigned (e.g., by the active scale server) a floating (alias) IP address from an available pool of floating IP address. This may be provided in addition to their actual (native) IP address. This floating IP address may be published into the signaling address as the media contact address of the media server, in some embodiments (e.g., in SDP).

The active scale server may be responsible for call management and conference management. The active scale schedule may (e.g., in consultation with a scheduler) determine which media server should provide media support for each conference. The decision algorithm may be based on the scheduler algorithm (e.g., in order to optimize port usage) and location information (e.g., in order to optimize bandwidth). For example, locations of the endpoints participating in existing and/or scheduled conferences may be used in combination with MCU locations in selecting a media server to provide media support for a conference, potentially taking advantage of location awareness to provide region specific support for conferences, which may minimize WAN usage. Upon receiving an incoming call, the active scale server may determine which media server should provide media support for the call (e.g., which media server provides media support for the conference in which the endpoint calling is participating).

The active server may maintain call context information/call state information (such as connection information, bit rate, resolution, display mode, network path, etc.) for each conference and/or for each endpoint participating in each conference for which a slave media server is providing media support. The call context or state information and any scheduler data may be backed up regularly (possibly continuously) to the passive scale server. The passive scale server may accordingly also maintain scheduling information and call context information for each conference.

In 904, the first signaling server may detect that the first signaling server has failed. Failure of the first signaling server may be detected based on the monitoring mechanism used by the first signaling server, in some embodiments. For example, according to one set of embodiments, in the event of active scale server failure, the passive server may detect the failure via the heartbeat mechanism. For example, the passive server may not receive a heartbeat signal from the active scale server within an allotted (e.g., predetermined) amount of time, and may accordingly decide that the active scale server has failed. Alternatively, the passive server may not receive a ping response signal (or multiple ping response signals) from the active scale server within an allotted (e.g., predetermined) amount of time, and may accordingly decide that the active scale server has failed.

The first signaling server may assume the role of active scale server in response to detecting that the second signaling server (the previous active scale server) has failed. This may include capturing the same floating IP address that the previous active scale server previously hosted. According to some embodiments, in order to do so the second signaling server (the new active scale server) may update the RARP requests, and hence the router(s), with the new MAC address. In other words, whereas packets were previously routed to the second signaling server's MAC address based on the floating IP address, after the first signaling server assumes (captures) the floating IP address, packets are routed to the first signaling server's MAC address based on the floating IP address. Thus, all packets that would have been dispatched to the second signaling server may instead be dispatched to the first signaling server (the newly assigned active scale server).

According to various embodiments, this transition may also effectively transfer all active call sessions. For example, for UDP sessions (e.g., SIP), session call context may have been previously copied to the passive scale server. In TCP sessions (e.g., H.323 and SIP-TLS), the session movement may be performed at the transport layer before the call contexts are brought up live. Meanwhile, because the slave media server hosting the media for the conference may still be up and running and independently providing media support for the conference, the signaling fail-over may be unnoticed by the participants of the various conferences.

Thus, in 906, as the newly assigned active scale server and in response to detecting that the second signaling server has failed, the first signaling server may facilitate conference signaling between endpoints and media servers in a similar manner as the second signaling server previously did. This may include registering media servers (e.g., any MCUs which join or re-join the cluster), receiving calls from endpoints, handling protocol negotiations (e.g., initiating sessions) with endpoints, selecting media servers to provide media support for conferences, maintaining scheduling data and call context data for conferences (e.g., newly initiated conferences or pre-existing conferences for which the second signaling server previously provided signaling support), and/or monitoring the media servers for failure, among other possible facilitative functions.

In the event of a media server failure, the active scale server (e.g., the first signaling server after failure of the second signaling server, or the second signaling server, prior to that) may detect the failure. For example, the active scale server may determine that no heartbeat signal (or ping response) has been received within a set amount of time.

In response to detecting failure of a media server, the active scale server may select another media server to provide media support for any conferences which were previously hosted by the failed media server. The new media server may be selected based on scheduler information (e.g., to optimize port usage) and location information (e.g., to optimize network bandwidth), and/or other information as desired.

According to one set of embodiments, the active scale server may reassign the failed media server's floating IP address to the newly selected media server and thereby move all conferences which were previously supported by the failed media server to the newly selected media server. FIG. 10 illustrates an exemplary system which operates according to one such set of embodiments. As shown, active scale server 1030 and media servers 1-4 1020A-D may be coupled to a network 1000. In addition to a native IP address 1050, each media server 1020 may also have been assigned an alias (e.g., floating) IP address 1060. As shown, if media server 4 1020D experiences a failure, alias IP address 4 1060D, which was assigned to media server 4 1020D, may be added to media server 3 1020C. The newly selected media server 3 1020C may then have both of alias IP addresses 3-4 1060C-D after failure of media server 4 1020D.

Media server 3 1020C may update any router(s) and/or other network equipment to associate its MAC address with the reassigned alias IP address 4 1060D. Media streams which are directed to IP address 4 1060D may accordingly start flowing to the media server 3 1020C, which may then provide media support for the conferences which were previously supported by failed media server 4 1020D.

Note that although in the illustrated embodiment media server 4 1020D may experience a failure and media server 3 1020C may be selected to provide media support for conferences previously supported by the media server 4 1020D, a similar fail-over process may be facilitated by active scale server 1030 between any of the media servers 1020 in the system. Additionally, note that similar fail-over procedures may be implemented in any number of variations of the illustrated system, and that the system illustrated in FIG. 10 is intended to be exemplary and non-limiting to the disclosure as a whole.

Note that in some embodiments, the entire fail-over process, from failure of the original media server to media streams flowing to the new media server, may be relatively short, and may in some cases be unnoticed by participants in affected conferences. In other embodiments, a brief gap in media support (e.g., a pause in conference audio/video) may be possible before automatically resuming, e.g., with no intervention by the participants or endpoints. According to various embodiments, the gap may be approximately 3 seconds, 2 seconds, 1 second, 500 ms, or 100 ms, or any length of time. According to some embodiments, the participant endpoints may remain connected to the conference(s) throughout the process, as the session/signaling link with the active scale server may be uninterrupted.

Thus, a high-availability conferencing system (such as system 800 illustrated in FIG. 8) supported by embodiments of the method of FIG. 9 may seamlessly move calls without any intervention and with very minimal interruption in the live conference, and may accordingly provide a much more reliable user experience. In particular, the illustrated architecture and accompanying methods for operating the system components (e.g., scale servers, MCUs) may provide a much better user experience relative to typical high availability conferencing clusters, in which end user intervention is generally required, either by re-dialing to get back into the conference or accepting a call from the system once the conference has been recreated. Since the end user is required to either dial a call or accept the call, there is a clear interruption in the conference, which can be a very irritating experience. In contrast, with the system and method of FIGS. 8-10, the end user may not even notice call movement, providing improved fail-over experience.

In addition, the coordination of the active scale server with scheduler and/or load balancer units and/or location information may allow the system to select a best media server for each call. In this way, improved port utilization and bandwidth efficiency may be achieved.

Embodiments of a subset or all (and portions or all) of the above may be implemented by program instructions stored in a memory medium or carrier medium and executed by a processor.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A non-transitory computer accessible memory medium storing program instructions for a backup signaling server to provide high-availability video conferencing, wherein the program instructions are executable by a processor to:
   monitor a signaling server, wherein the signaling server facilitates video conference signaling between endpoints and media servers, wherein the media servers provide media support for video conferences between the endpoints, including providing one or more of: receiving, decoding, mixing, compositing, encoding, or transmitting media streams to and from endpoints participating in the conferences;
   detect that the signaling server has failed;
   facilitate video conference signaling between the endpoints and the media servers in response to detecting that the signaling server has failed.

2. The non-transitory computer accessible memory medium of claim 1, wherein the signaling server maintains scheduling data and call context data for video conferences supported by the media servers, wherein the program instructions are further executable to:
   maintain the scheduling data and the call context data for the video conferences supported by the media servers.

3. The non-transitory computer accessible memory medium of claim 1,
   wherein the program instructions for monitoring the signaling server are further executable to periodically receive a heartbeat signal from the signaling server;
   wherein the program instructions for detecting that the signaling server has failed are further executable to detect an absence of the heartbeat signal from the signaling server.

4. The non-transitory computer accessible memory medium of claim 1, wherein the program instructions for facilitating video conference signaling between the endpoints and the media servers are further executable to:
   register the media servers;
   establish calls with the endpoints;
   select media servers to provide media support for video conferences for the endpoints;
   monitor the media servers for failure.

5. A method for providing high-availability video conferencing, wherein the method is implemented by a backup signaling server, the method comprising:
   monitoring a signaling server, wherein the signaling server facilitates video conference signaling between endpoints and media servers, wherein the media servers provide media support for video conferences between the endpoints, including providing one or more of: receiving, decoding, mixing, compositing, encoding, or transmitting media streams to and from endpoints participating in the conferences;
   detecting that the signaling server has failed;
   facilitating video conference signaling between the endpoints and the media servers in response to detecting that the signaling server has failed.

6. The method of claim 5,
   wherein the signaling server maintains scheduling data and call context data for video conferences hosted by the media servers;
   wherein the backup signaling server also maintains the scheduling data and the call context data for the video conferences hosted by the media servers.

7. The method of claim 5,
wherein monitoring the signaling server comprises periodically receiving a heartbeat signal from the signaling server;
wherein detecting that the signaling server has failed comprises detecting an absence of the heartbeat signal from the signaling server.

8. The method of claim 5, wherein facilitating video conference signaling between the endpoints and the media servers comprises:
registering the media servers;
receiving calls from the endpoints;
selecting media servers to host video conferences for the endpoints based on receiving calls from the endpoints;
monitoring the media servers for failure.

9. A backup signaling server computer system configured to provide high availability video conferencing, the backup signaling server comprising:
a processor;
a non-transitory computer accessible memory medium storing program instructions executable by the processor to:
monitor a signaling server, wherein the signaling server facilitates video conference signaling between endpoints and media servers, wherein the media servers provide media support for video conferences between the endpoints, including providing one or more of: receiving, decoding, mixing, compositing, encoding, or transmitting media streams to and from endpoints participating in the conferences;
detect that the signaling server has failed;
facilitate video conference signaling between the endpoints and the media servers in response to detecting that the signaling server has failed.

10. The backup signaling server computer system of claim 9, wherein the signaling server maintains scheduling data and call context data for video conferences supported by the media servers, wherein the program instructions are further executable to:
maintain the scheduling data and the call context data for the video conferences supported by the media servers.

11. The backup signaling server computer system of claim 9,
wherein the program instructions for monitoring the signaling server are further executable to periodically receive a heartbeat signal from the signaling server;
wherein the program instructions for detecting that the signaling server has failed are further executable to detect an absence of the heartbeat signal from the signaling server.

12. The backup signaling server computer system of claim 9, wherein the program instructions for facilitating video conference signaling between the endpoints and the media servers are further executable to:
register the media servers;
establish calls with the endpoints;
select media servers to provide media support for video conferences for the endpoints;
monitor the media servers for failure.

\* \* \* \* \*